June 14, 1949.    E. G. BLUNIER    2,473,357
SWINGING DRAWBAR
Filed May 24, 1948

Inventor
EDWARD G. BLUNIER
Attorney

Patented June 14, 1949

2,473,357

UNITED STATES PATENT OFFICE 2,473,357

SWINGING DRAWBAR

Edward G. Blunier, Roanoke, Ill.

Application May 24, 1948, Serial No. 28,871

4 Claims. (Cl. 280—33.44)

This invention relates in general to an implement pulling adapter for removable attachment to the hydraulic tool lift mechanism of an agricultural tractor and relates more specifically to a type of implement adapter having a swinging drawbar.

In the so-called "Ford-Ferguson" type of tractor, as illustrated in U. S. Patents Nos. 1,687,719, 2,118,180 and 2,118,181, a problem arises which has long been bothersome but to which no remedy has hitherto been provided. These tractors are normally used with tools designed expressly for use with them and especially for attachment by their own particular attaching mechanism. However, in some instances, tools have not yet been appropriately designed or, in other instances, a given tractor user already possesses a tool which he does not wish to replace. Hence, a need arises for drawing a conventional style tool, having provision for drawing at a single point at the forward end of a drawbar, by this type of tractor.

This is conventionally done by providing a fixed drawbar between the extended ends of the horizontal lift bars and providing another pair of bars from the respective ends of the said fixed drawbar to the single upper attachment point on the rear of the tractor. Thus the fixed drawbar and the converging pair of bars constitute the conventional A-frame which is otherwise usually built into the tool especially designed for use with this type of tractor. The single point drawbar tool is then attached pivotally to some point on the fixed drawbar.

This works reasonably well in some instances, but it is at best a makeshift and with such an arrangement it has long been recognized that it is often difficult to make a turn when the tractor is pulling a ground working tool under heavy load, such as a spring tooth harrow. Under such conditions, the tractor sometimes fails to respond when the operator turns the front wheel or wheels of the tractor. Instead, the tractor tends to continue in the same direction in which it was moving before a turn was attempted while the front wheels skid along the ground sideways. It then becomes necessary to brake one driving wheel in order to turn the tractor.

This has been a particular nuisance in the operation of these tractors and yet the only alternative prior hereto has been for the user to purchase a complete set of tools especially designed for this type of tractor wherever available and where not available there has been no remedy.

It has been discovered that this turning difficulty is substantially decreased as the pivot point between the tractor drawbar and the tongue or handle of the agricultural implement being drawn by the tractor, is moved toward the vertical plane through the axis of the driving wheels. However, according to former practice, for tractors equipped with a hydraulic tool lift this would have been accomplished by providing a separate swinging drawbar, pivotally mounted upon said tractor, independent of the lift mechanism in order to place the pivot point of said swinging bar within said plane of the axis of the driving wheels. Such an arrangement would be both awkward and costly, would substantially defeat the purpose of the tool lift mechanism and would not be satisfactory.

Therefore, it is desirable to provide means for application to tractors having a hydraulic tool lift and attachment mechanism, which may be removably supported upon such tool lift mechanism, for pulling with such a tractor a conventional tool having a single point for pulling attachment whereby the pivotal hitching point between the tractor and the tool is placed substantially closer to the axis of the driving wheels than is normally possible.

Accordingly, the primary object of this invention is to provide a swinging drawbar attachment for removable support upon the hydraulic tool lift mechanism of a tractor.

A further object of this invention is to provide a swinging drawbar, as aforesaid, which may be quickly and easily removed from the hydraulic tool lift mechanism of a tractor.

A further object of this invention is to provide a swinging drawbar for a tractor having a hydraulic tool lift mechanism, as aforesaid, whereby the pivotal hitching point between the tractor and a conventional agricultural implement drawn thereby is positioned substantially closer to the axis of the tractor driving wheels than is normally possible and thereby greatly increases the effectiveness of the tractor front wheel or wheels in turning the tractor.

A further object of this invention is to provide a means whereby a hydraulic tool lift mechanism for a tractor may be quickly and easily modified for more effective and responsive operation with conventional ground working implements having only a single point for pulling attachment.

Other objects and purposes of this invention will become apparent to persons familiar with this type of equipment upon referring to the accompanying drawings and upon reading the following specification.

In meeting those objects and purposes heretofore mentioned, as well as others incidental thereto and associated therewith, I have provided a swinging drawbar attachment comprised of a bar support frame and a swinging bar pivotally secured to said frame for movement in a horizontal plane. The bar frame is removably supportable upon and by the brace rods and lift rods of a hydraulic tool lift mechanism for a tractor.

For illustrations of a preferred embodiment of the invention, attention is directed to the accompanying drawings in which.

Construction

For convenience in reference, there will first be described the essentials of a typical hydraulic tool lift mechanism of the type with which my adapter is particularly designed to operate. It will be evident, however, that this is for illustrative purposes only and that by easy modification my adapter may readily be applied to any tool engaging mechanism of this general type.

Figure 1:
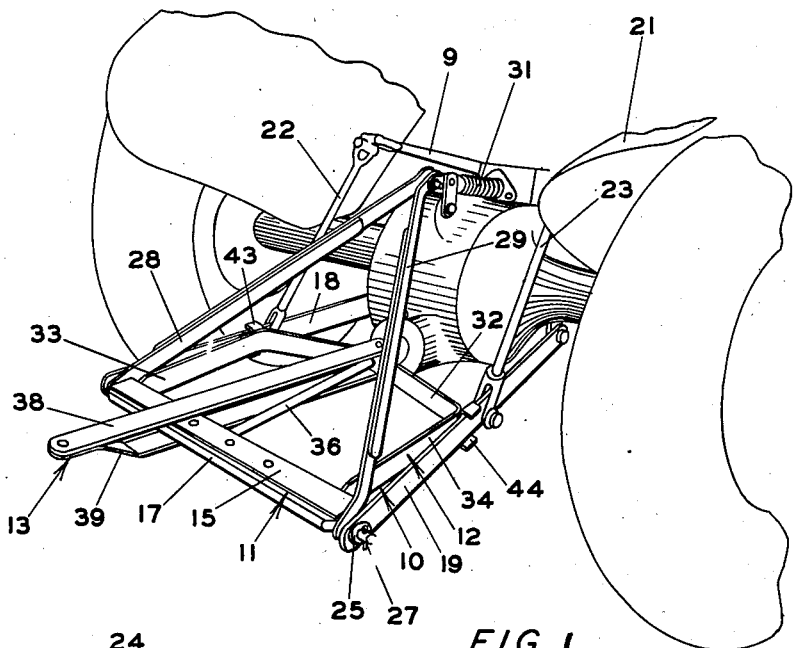
Figure 1 is a fragmentary, perspective view of the rear end of a tractor equipped with a hydraulic tool lift mechanism and my swinging drawbar attachment, to which this invention relates.

The tool engaging and lifting means on the standard "Ford-Ferguson" tractor, as illustrated in the aforesaid patents, comprises the lift bars 18 and 19 which are pivotally supported upon and extend from the rear end of a tractor 21 (Figure 1). The lift bars 18 and 19 are pivotally engaged intermediate their rearwardly extended ends and said tractor by a pair of lift rods 22 and 23, respectively, which are each secured to a hydraulic lift arm, one being shown at 9, in a conventional manner. The upper attaching point and shock absorber are indicated at 31.

To adapt this mechanism to the pulling of a tool having a single point drawbar, it is conventional to provide a fixed draw bar 17, which drawbar is supported at its ends by the standard ball and socket joints 24 and 25 mounted near the rearwardly extended ends of the lift bars 18 and 19. From the ends of the fixed drawbar, there extends a pair of brace bars 28 and 29 to said shock absorbing mechanism 31. Thus the fixed drawbar and the brace bars comprise the A-frame normally mounted directly onto the tool. Suitable openings are provided in the fixed drawbar 17 for the reception of a fastening pin by which is fastened thereto the drawbar of a tool having the single point of attachment.

Figure 2:
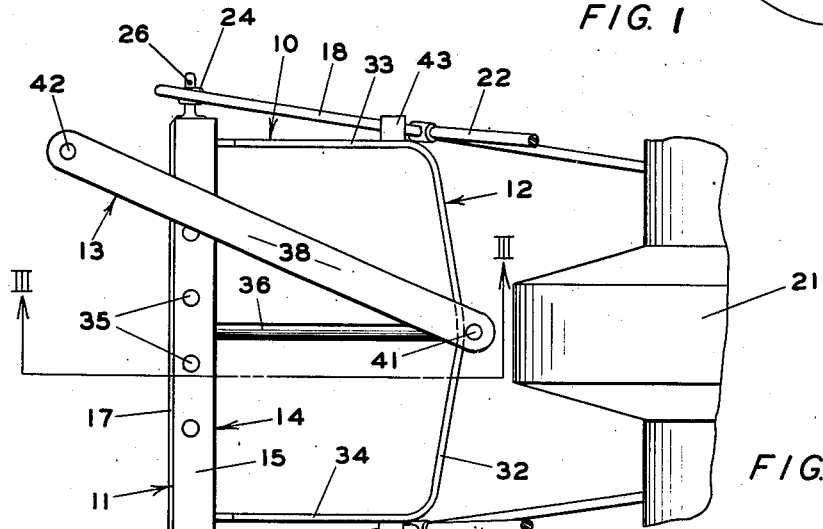
Figure 2 is a top plan view of said swinging drawbar supported upon a fragment of the tractor and tool lift mechanism.
Figure 3:
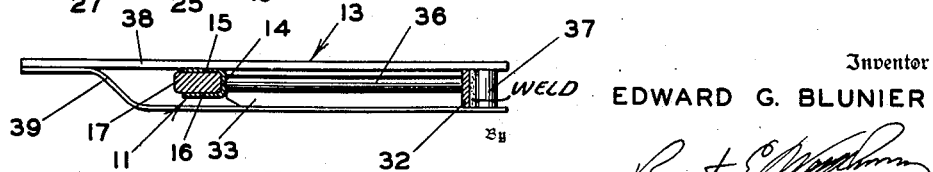
Figure 3 is a sectional view taken along the line III—III of Figure 2.

As shown in Figures 2 and 3, the implement pulling adapter 10, to which this invention relates, is comprised of a support bar, or channel member 11, a U-shaped frame member 12 and a swing bar, or swinging drawbar 13.

The support bar 11 which is preferably, but not necessarily channel shaped, has a web 14 and a pair of substantially parallel flanges 15 and 16 secured to said web 14 (Figure 3). The flanges 15 and 16 are advantageously so disposed with respect to each other that said fixed drawbar 17 may be slidably received therebetween. The support bar 11 is preferably slightly shorter than the length of the fixed drawbar 17.

Inasmuch as the exact operation and construction of the hydraulic tool lift mechanism, other than that mentioned above, does not enter into or limit the scope of the invention, further description and details thereof will be omitted.

A pair of locking pins 26 and 27 extend through appropriate openings in the fixed drawbar 17 outboard of the ball joints 24 and 25 to prevent an accidental disengagement between said fixed drawbar and said lift bars.

The U-shaped frame member 12, Figure 2, is comprised of a cross beam 32, which is substantially parallel with the support bar 11, and a pair of substantially parallel connecting legs 33 and 34, which may be integral with and substantially perpendicular to the cross beam 32 and extend in the same direction therefrom. The connecting legs 33 and 34 are substantially parallel with and adjacent to the lift bars 18 and 19, respectively. Those ends of said connecting legs 33 and 34 remote from the cross beam 32 are secured, as by welding, to the web 14 near the opposite ends thereof and on that side thereof opposite the flanges 15 and 16. The flanges 15 and 16 of the channel member 11 are provided with a plurality of hitch openings 35 which are in register with the said similar hitch openings in the fixed drawbar 17. The frame member 12 may be fabricated from any suitable material such as metal bar stock.

A suitable bracing means, such as the brace rod 36, may be provided to extend between the cross beam 32 and the channel web 14, said brace rod being secured to said cross beam and said channel web in any suitable manner, such as by welding. The brace rod 36, which may be fabricated from tubular or bar stock of any suitable material, is preferably parallel with and midway between the connecting legs 33 and 34. Additional bracing within the U-shaped frame member may be added as desired or required without departing from the scope of the invention.

A swing bar bearing 37 which may be fabricated from a piece of metal tubing of any convenient, conventional material, is welded to the cross beam 32 with its axis in the vertical position. The bearing 37 is preferably disposed midway between the connecting legs 33 and 34 and on the opposite side of said cross beam from said brace rod 36.

The U-shaped frame member is advantageously constructed so that the swing bar bearing 37 is as close to the tractor 21 as it can be and still permit operating freedom of the swing bar 13.

The swing bar 13 is preferably comprised of an upper member 38 and a lower member 39, which members are substantially parallel with each other, are positioned on opposite sides of both the U-shaped frame member 12 and the support bar 11, and are fabricated from any appropriate material, such as metal bar stock. A pivot post 41, which is rotatably supported within the swing bar bearing 37, extends through said bearing and is secured to corresponding ends of the upper and lower members 38 and 39, respectively, of the swing bar 13. The upper swing bar member 38 extends from the pivot post 41 across and beyond the support bar 11. The lower swing bar member 39 extends from said pivot post under and beyond the support bar 11 where it curves upwardly to engage and be secured to the upper member 38 in any suitable manner, such as by welding. A hitch opening 42 is provided in that end of the swing bar 13, which extends beyond the support bar 11, for engagement with the ground working implement to be drawn. The upper member 38 is preferably fabricated from stronger and more durable material than the lower member 39 and, therefore, supports the major portion of the load to which the swing bar 13 is subjected.

A pair of U-shaped, metal guide clips 43 and 44, which are secured to the connecting legs 33 and 34, respectively, in any convenient manner, such as by welding, slidably engage the lift bars 18 and 19, respectively, between the ball and socket joints 24 and 25 and the lift rods 22 and 23, respectively. The said guide clips are advantageously positioned on said legs so that when the implement pulling adapter 10 is in operable position, the guide clips are immediately adjacent to the lift rods 22 and 23 for reasons which will hereinafter become apparent.

*Operation*

When the implement pulling adapter 10 is in operating position, as shown in the figures, between the lift bars 18 and 19, said adapter is prevented from moving away from the tractor by the fixed drawbar 17 which lies between the flanges 15 and 16 and against the web 14 of the support bar 11. The adapter 10 is prevented from moving toward the tractor by the guide clips 43 and 44 which are immediately adjacent to and preferably bear against the lift rods 22 and 23. The adapter 10 is prevented from movement upwardly or downwardly with respect to the lift bars 18 and 19 and the fixed drawbar 17 by means of the flanges 15 and 16 of the support bar 11 and the guide clips 43 and 44. Thus, when the adapter 10 is properly mounted upon the lift mechanism, it is rigidly held with respect thereto, and only the swing bar 13 remains movable.

The swing bar 13 is free to swing from one end of the fixed drawbar to the other end when the brace bars 28 and 29 are being used. If said brace bars are removed, however, said swing bar is permitted even greater swinging freedom. Alternatively, if desired, the swing bar 13 may be locked in a given position with respect to the support bar 11 and the fixed drawbar 17 by inserting suitable pins through the appropriate openings 35 in the flanges 15 and 16.

It will be appreciated that the adapter may be quickly and easily installed into operating position and removed therefrom, and that such operations may be carried out without the use of tools other than those needed to insert and withdraw the pins 26 and 27.

For installation, the channel 11 is placed over the fixed drawbar 17 and the clips 43 and 44 are led onto the lift bars 18 and 19. When these are moved sufficiently forwardly toward the tractor, the extending pivot pins of the fixed drawbar are inserted into the openings within the ball joints 24 and 25, the lift bars brought toward each other and the fastening pins 26 and 27 put into place. The brace bars 28 and 29, if used, will then be fastened to the shock absorbing mechanism 31. For removal, these steps are reversed.

It will be recognized that other similar, convenient types of frame work may be used in place of the frame work hereinabove described for supporting the swing bar 13 upon a hydraulic tool lift mechanism. However, such alternate or modified frame work shall be considered within the scope of this invention if it places the pivot point of said swing bar substantially closer to the tractor 21 than would otherwise be possible with the conventional tractor equipped with a tool lift mechanism. It is not my intention implied or otherwise, to eliminate other variations or modifications which do not depart from the scope of the invention unless specifically stated to the contrary in the hereinafter appended claims.

I claim:

1. In an implement pulling adapter for removable support upon the hydraulic tool lift mechanism of an agricultural tractor, said lift mechanism having a pair of substantially parallel and horizontal lift bars extending rearwardly from said tractor and mutually engaged at their extended ends by a cross bar, and a pair of lift rods engaging said lift bars intermediate said tractor and said cross bar, the combination comprising: a channel member having a web and a pair of substantially parallel rearwardly extending flanges, said channel member being slightly shorter than the distance between the extended ends of said lift bars when engaged by said cross bar, said cross bar being slidably receivable between said flanges; a U-shaped frame member extending forwardly from said channel member between said lift bars and having a cross beam and a pair of legs, the extremities of said legs remote from said cross beam being secured to the web of the channel member, one near each end thereof, and said legs being adjacent to and substantially parallel with said lift bars; a brace rod extending between the midpoint of said channel member web and the midpoint of said cross beam, a swing bar pivotally supported upon said cross beam near said brace rod, said swing bar having substantially parallel, interconnected upper and lower members which lie on opposite sides of said frame member and extend from said cross beam beyond said channel member for engagement by a ground working implement; and a clip secured to each of said legs near said cross beam for slidably engaging said lift bars on the upper and lower edges thereof between said lift rods and said cross bar, whereby accidental removal of said implement pulling adapter from said tool mechanism is positively prevented.

2. In an implement pulling adapter for removable support upon the hydraulic tool lift of a tractor, said tool lift having a pair of substantially parallel lift bars extending from said tractor and mutually engaged at their extended ends by a cross bar, and a pair of lift rods engaging said lift bars intermediate their extremities, the combination comprising: a channel having a web and a pair of flanges, said channel being shorter than said cross bar and said cross bar being slidably receivable within said channel rearwardly of said web; a U-shaped member lying forwardly of said channel between said lift bars and having a cross beam and a pair of legs extending therefrom adjacent to said lift bars, the free ends of said legs being secured to said channel web; a brace means between said cross beam and said channel; a swing bar pivotally supported upon said cross beam midway between said legs, said swing bar having interconnected upper and lower members which lie on opposite sides of said U-shaped member and extend beyond said channel member; and means secured to each leg for engaging the adjacent lift bar at a point thereon between said lift rod and said cross bar.

3. In an implement pulling adapter for removable support upon the hydraulic tool lift mechanism of a tractor, the combination comprising: a channel having a web and a pair of substantially parallel flanges; a U-shaped frame member lying substantially within a plane parallel with said flanges, said frame member having a cross beam substantially parallel with said channel and a pair of parallel legs extending from and secured to the ends of said cross beam, said legs extending in substantially the same direction and being secured to said channel web near the ends thereof and on the side opposite said flanges; a brace means extending between said cross beam and said channel web; a swing bar pivotally supported upon said cross beam midway between said legs, said swing bar having interconnected upper and lower members which lie on opposite sides of said U-shaped frame member and extend beyond said channel member; and means secured to said legs near said cross beam for slidably engaging said tool lift mechanism and thereby preventing accidental removal of said implement pulling adapter from said tool lift mechanism.

4. In an implement pulling adapter for removable support upon the hydraulic tool lift of a tractor, the combination comprising: a support bar; a U-shaped frame member having its free ends secured to opposite ends of said support bar; brace means between said support bar and said frame member; a swing bar pivotally supported at a point upon said frame member spaced forwardly from said support bar and substantially upon a perpendicular bisector of said support bar, said swing bar extending over and beyond said support bar; and means secured to said frame member slidably engaging said tool lift for preventing vertical movement with respect thereto.

EDWARD G. BLUNIER.

REFERENCES CITED

The following references are of record in the file of this patent:

UNITED STATES PATENTS

| Number | Name | Date |
| --- | --- | --- |
| 1,715,682 | Starks | June 4, 1929 |
| 2,392,903 | Currie | Jan. 15, 1946 |